Nov. 22, 1938.  W. H. HUNT  2,137,291
MEANS AND METHOD FOR PREPARING FISH FOR FILLETING
Filed Jan. 2, 1936  4 Sheets-Sheet 1
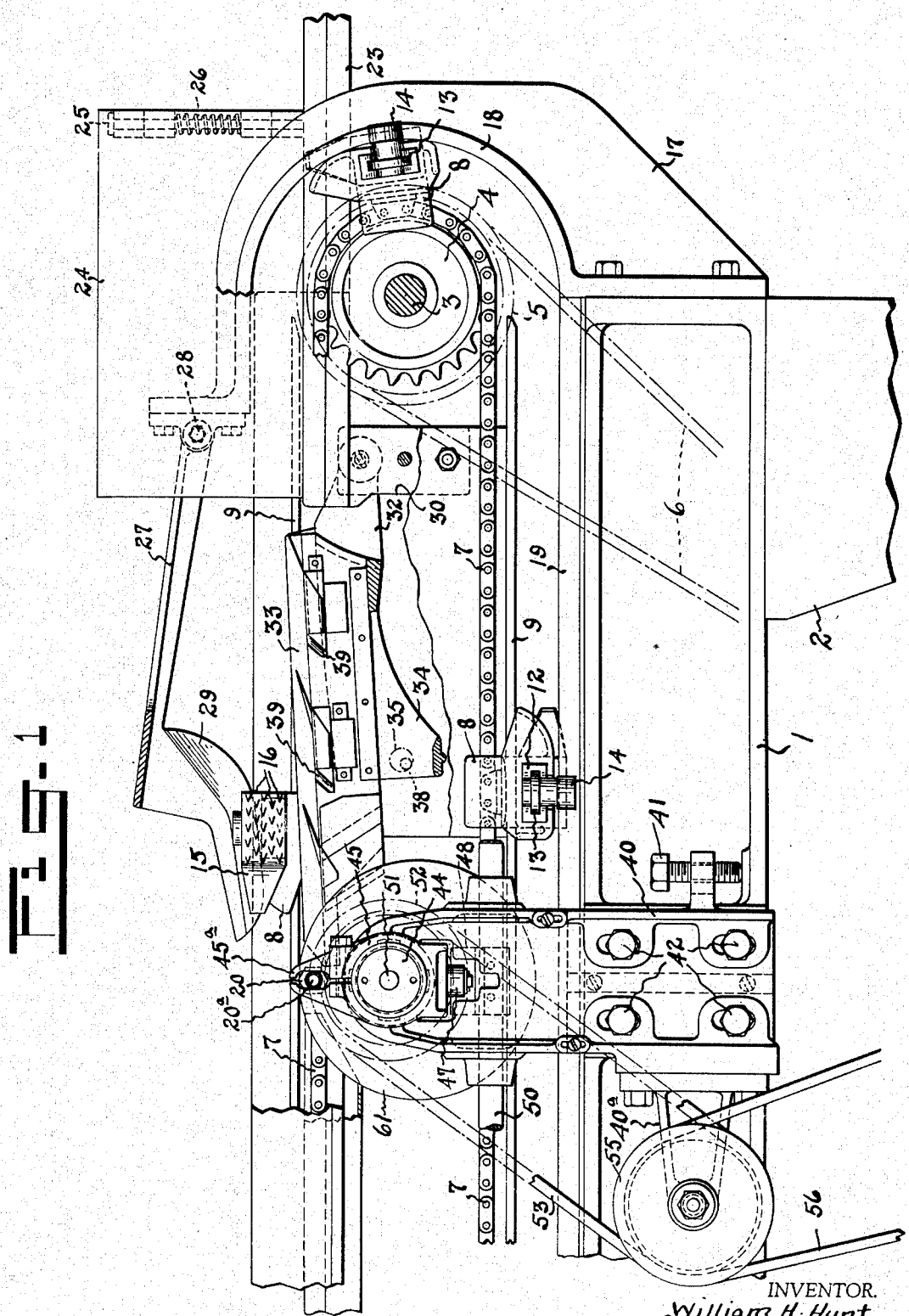
INVENTOR.
William H. Hunt
BY
Darby & Darby
ATTORNEYS.

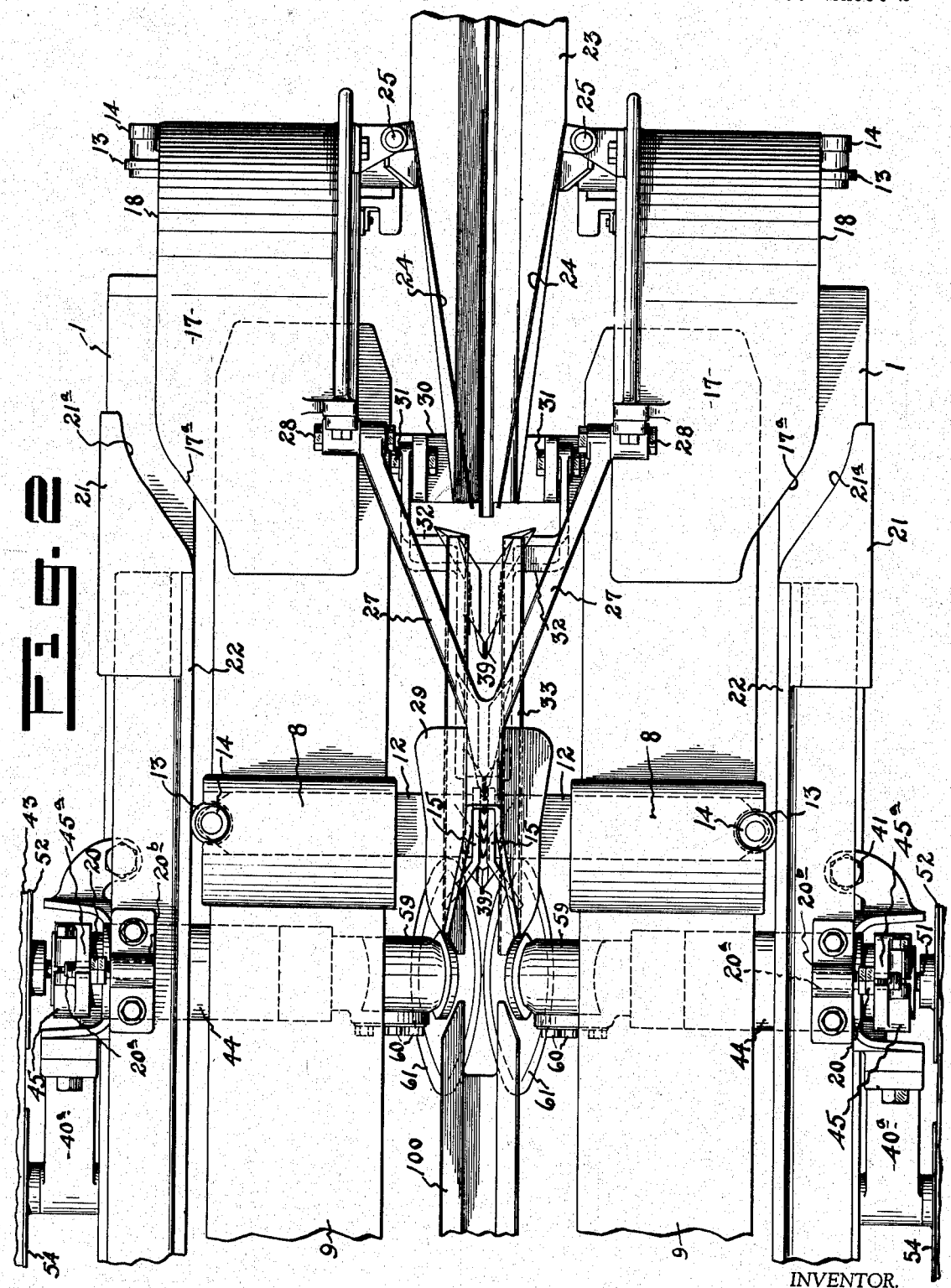

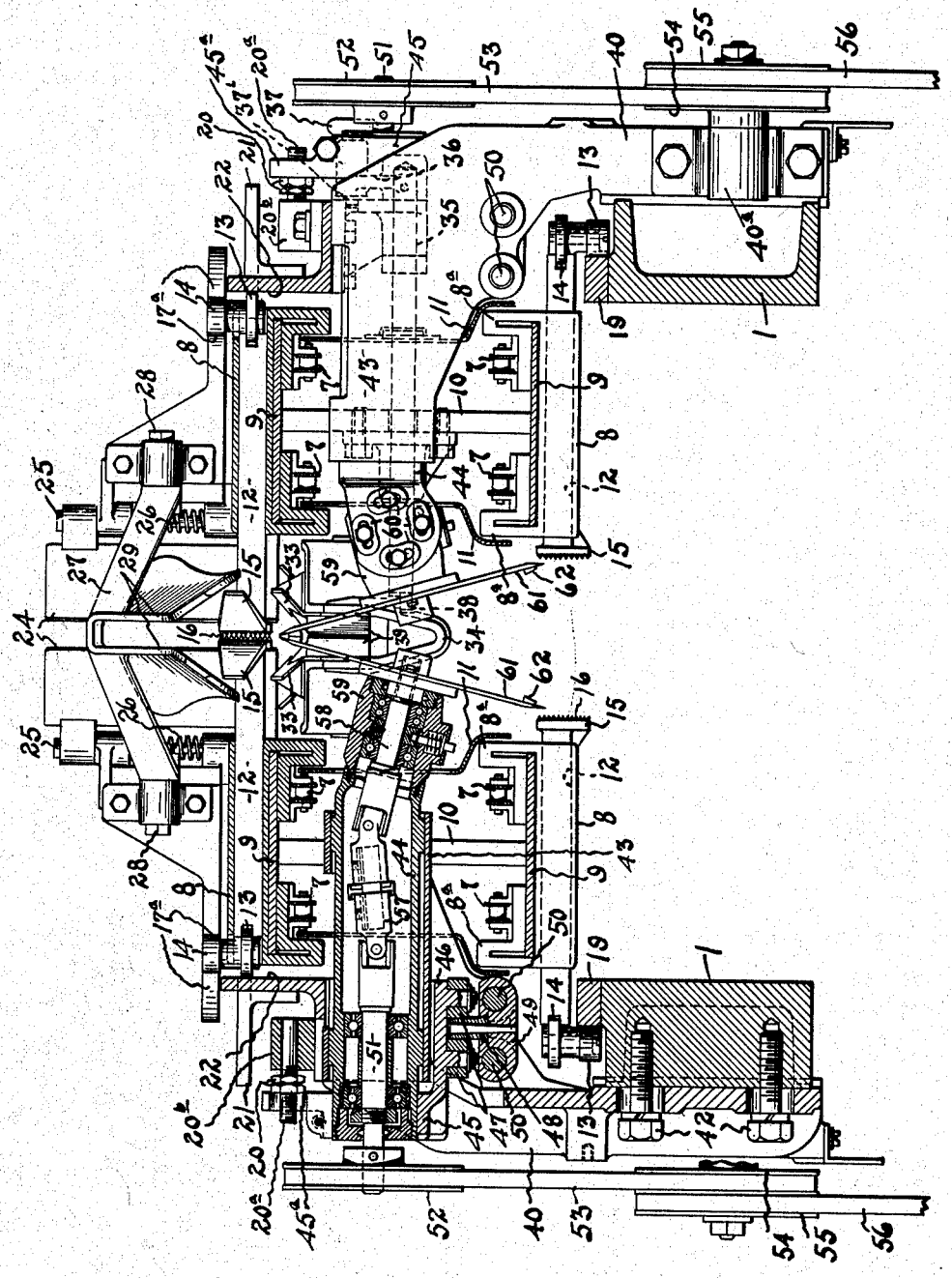

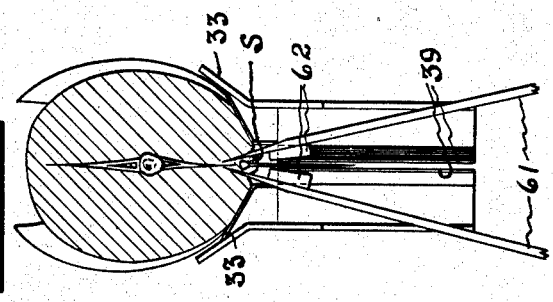
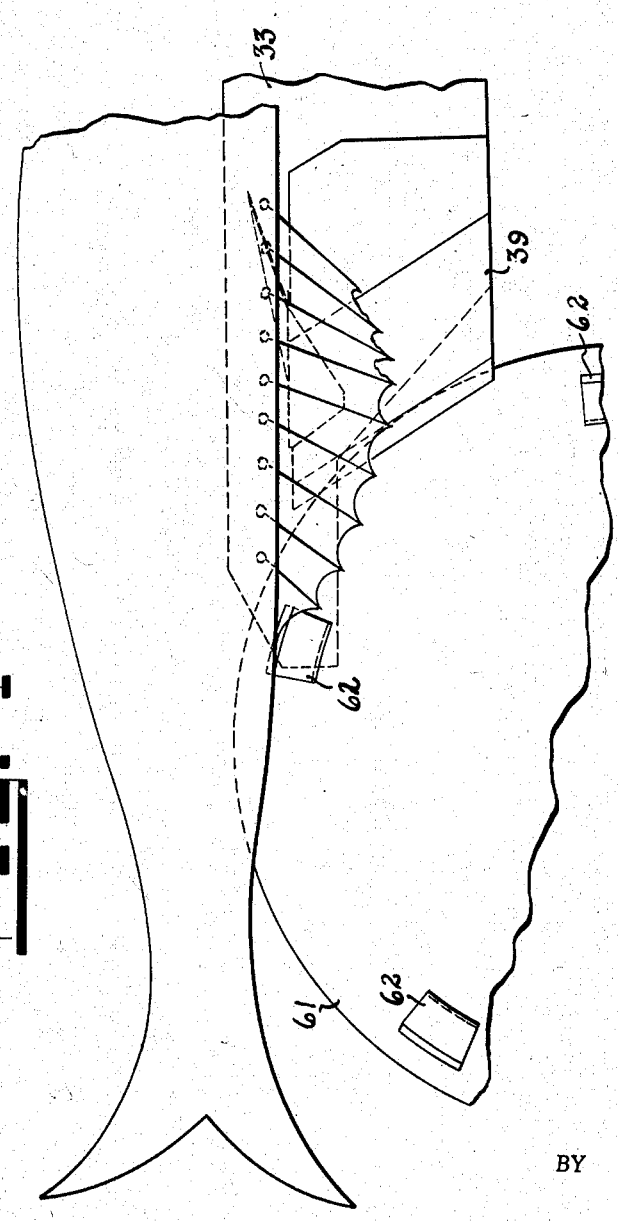
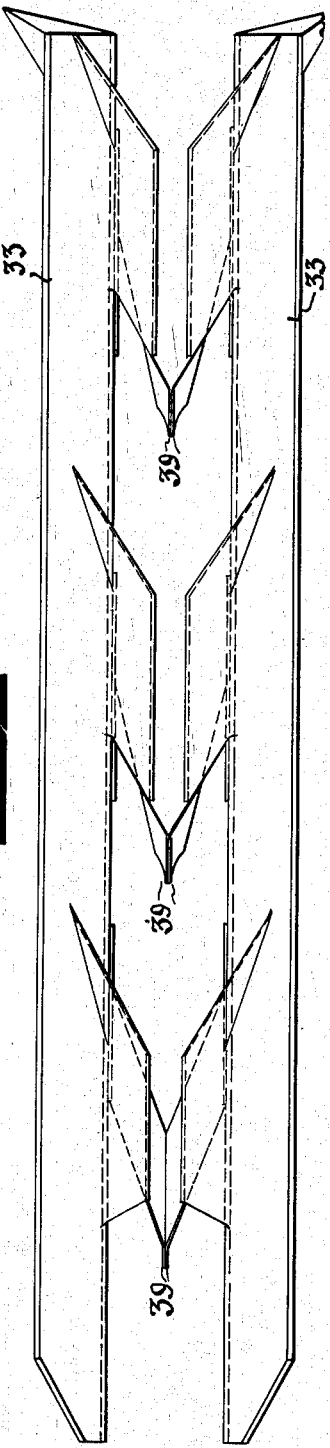

Patented Nov. 22, 1938

2,137,291

UNITED STATES PATENT OFFICE 2,137,291

MEANS AND METHOD FOR PREPARING FISH FOR FILLETING

William H. Hunt, National City, Calif., assignor to Fish Machinery Corporation, San Diego, Calif., a corporation of California Application January 2, 1936, Serial No. 57,179

29 Claims. (Cl. 17—3)

This invention relates to improvements in fish filleting machines.

An important object of this invention is the provision of mechanism which may be used either alone or in conjunction with a fish filleting machine by means of which a small strip of skin and flesh of substantially triangular cross section is removed from the back of a fish from the tail end towards the head end, for the purpose of removing the dorsal fins and associated knuckles.

Another object of this invention is to provide a completely automatically operating machine for this purpose by means of which the above object may be accomplished with a minimum loss of meat.

A further object of this invention involves the novel method of moving a fish in the direction of its length and simultaneously cutting and stripping therefrom a strip of flesh and skin with the dorsal fins and associated knuckles attached.

A still further object of this invention is to provide a means and method for effecting the above objects whereby a fish is prepared for subsequent removal of the fillets from the bony framework of a fish to effect maximum recovery of flesh.

More specifically an object of this invention is to provide an attachment, improvement or addition to a fish filleting machine of the type disclosed in my copending application Serial No. 754,727, filed November 26, 1934, for "Means and method of filleting fish."

The many other novel objects of this invention which are successfully secured by means of the structure herein disclosed and carried out by the method described will become apparent from the following detailed description of the structure and the operation thereof.

This invention resides substantially in the combination, construction, arrangement, relative location of parts, steps and series of steps, all as will be described in full detail and pointed out in the appended claims.

In the drawings,

Figure 1 is a view of the mechanism of this invention partly in cross section and partly in side elevation with some parts broken away;

Figure 2 is a top plan view thereof;

Figure 3 is a transverse vertical cross sectional view with some parts in elevation of this mechanism;

Figure 4 is a diagrammatic view showing the relationship between a fish, the circular knives, and the fin straightening and guiding device;

Figure 5 is a similar but cross sectional view of these parts; and

Figure 6 is a top plan view of a portion of the fin straightener and guide.

There is disclosed in my copending application mentioned above a machine for filleting fish in a manner to effect a high recovery of flesh from the fish skeleton or framework. By means of this machine a fish which has been headed is advanced tail first and back down along a defined path of travel along which it is subjected to various operations whereby a pair of parallel incisions are first made in the back of the fish near the base of the tail on opposite sides of the back spikes. These incisions are made up to the top side of the backbone on opposite sides of the back spikes and continue throughout the length of the fish from the tail end to the head. Guide members enter these incisions and guide the fish by engagement with its backbone as it is pulled along in the direction of its length, and at the same time these guide members cut the back flesh of the fish for a distance from the backbone outwardly. At the time the initial incisions are made at the base of the tail the dorsal fins are straightened and guided between the cutting knives. The fish then moves into the range of action of a pair of circular knives which slit it from the tail end towards the head end on the belly side and on opposite sides of the ventral fin. The fish is then moved on into engagement with suitably shaped slicing knives which slice the flesh from the ribs, after which the fillets thus formed are detached from the skeleton.

By this method the recovery of flesh is somewhat reduced by the fact that the back slicing knives which form the parallel incisions from end to end must be spaced apart a sufficient distance to permit the knuckles at the base of the back, or dorsal fins, to pass therebetween without binding. When it is realized that the space between these back slicing knives is fixed and that a machine of this type must be adapted to treat various sizes of fish, it will be apparent that a practical spacing for these knives must take into account the varying sizes of dorsal fin knuckles to be accommodated. The result is that in a practical machine of this type a considerable amount of flesh is necessarily lost as represented by the flesh at the back in which the back spikes are embedded, as a result of this necessary spacing of the back slicing knives.

The basic object of this invention is to provide a machine and method for first subjecting the fish to the action of a pair of circular knives, preferably converging, which engage the fish along the back from the tail end, making a V-shaped incision along the back, with the result that a narrow strip of flesh is cut and later stripped from the fish, to which are attached the dorsal fins and their associated knuckles. In the subsequent back slicing operation wherein, as previously described, the fish is sliced on opposite sides of the back spikes from end to end and up to the top of the backbone, it will be apparent that the knives which effect this slicing operation may be brought much closer together, greatly increasing the recovery of flesh. The mechanism herein disclosed is therefore adapted for inclusion in the machine of my copending application mentioned above at the end of the machine to which the fish are fed, and will form the initial part thereof.

The right hand end or the fish entry end of the machine has been shown in the drawings. The side frame members are illustrated at 1, as supported upon legs or standards 2. At 3 is a shaft extending transversely of the bed or frame and journaled in suitable bearings mounted on the side members but not shown. Mounted on the shaft are two pairs of sprockets 4 over which the endless chains 7 pass. As will be seen from Figure 3, there are two pairs of these chains 7 which extend substantially horizontally from the sprockets 4 to another set of sprockets towards the left, but not shown in these figures. The shaft 3 may be rotated from any suitable power source in any desired manner. However, for purposes of illustration there has been indicated in Figure 1 a pulley 5 mounted on the shaft and operated by means of a belt 6, driven in any suitable manner.

Mounted on each pair of chains 7 and transversely aligned are a pair of blocks or carriers 8 which in detailed construction are somewhat similar to those illustrated in my above mentioned copending application. These blocks or carriers are provided with side extensions 8ᵃ which are attached at their terminal extensions to the chain pairs, as will be seen particularly in Figure 3. These side extensions terminate in spaced relation to the main body portion of the blocks, as is clear from Figure 3, to provide a channel or passage into which the spaced plates 9 pass. These plates extend longitudinally of the machine, a pair on each side and vertically spaced, as is clear from Figures 1 and 3.

As illustrated in Figure 2, these plates are merely long strips or bars preferably of metal positioned so that the blocks or carriers 8 may slide therealong in traveling both on the upper and lower levels of their path of travel. By this arrangement the blocks are caused to move along straight lines, and are not allowed to follow the curved path which would otherwise naturally result from the sagging of the chains. The pairs of strips 9 are supported at opposite sides of the frame and held in proper spaced relation by means of the connecting members 10. These members 10 are supported from the body of the frame by arms or brackets which do not appear in the drawings. Extending along the path of travel of the chains on the opposite sides thereof are the guard or cover plates 11, which as shown in Figure 3, are shaped at their lower ends to fit around the outside of the side extensions 8ᵃ of the blocks on their lower level, and to fit between these extensions and the chains on the upper level. This encloses the chain structure and protects the chains and associated structure from moisture and the like.

Each block or carrier 8 is provided with a channel therethrough extending transversely of the path of travel of the chains in which are reciprocally mounted the bars or rods 12 which terminate in enlarged plate-like ends 15 which have a series of sharp projections 16 on the face thereof. Journaled on the opposite end of each plunger is a pair of rollers 13 and 14. It will be noted that the rollers 14 are journaled so as to be in line with the ends of the rods. As will be seen from Figures 2 and 3, the forward edges of the plates 15 diverge in the direction of travel on the upper level. The purpose of this construction will be described later.

As will be seen from Figures 1 and 2, there is secured to the ends of the side members 1, a pair of curved arms or brackets 17 which extend up over the guide plates 9 and have formed on the outer edges camming surfaces 18. These camming surfaces 18 are so positioned as to be engaged by the rollers 14 as the blocks 8 swing along a curved path from the lower level to the upper level in their path of travel. Supported on the side members 1, as will be seen in Figure 3, and extending along side the path of travel of the blocks on the lower level are the camming bars 19 which are so positioned as to engage the rollers 13 throughout their path of travel along the lower level. Extending along the sides of the machine and parallel to the upper level of travel of the blocks are the angle irons 22, the inner faces of which act as camming surfaces for engagement with the rollers 13. At the initial ends of the angle bars 22 are the cam plates 21 which have curved camming edges 21ᵃ which merge into the camming faces of the angle irons. The adjacent portions of the camming surfaces 18 of the curved arms 17 are similarly curved as shown at 17ᵃ. It is to be noted, however that the camming surfaces 21ᵃ are on a lower level than the camming surfaces 17ᵃ since they respectively engage the rollers 13 and 14. At 23 is the supply chute or guide upon which the fish are placed for introduction into the machine. Pivotally mounted on the sides of this chute are a pair of gates 24 which swing on vertical pivot pins 25 supported from the sides of the curved arms 17.

As is clear in Figure 3, a pair of coiled springs 26 are provided and arranged so as to cause the gates 24 to converge in the direction of movement of a fish as it passes therebetween. It may be here noted that any suitable form of gate construction may be employed, as illustrated by the somewhat different construction disclosed in my above mentioned copending application.

At 27 are a pair of converging arms which are pivotally mounted at 28 on the arms 17. At the apex of these arms is a V-shaped plate or pressure shoe 29 which presents downwardly and is positioned to bear down upon a fish on the belly side as it moves thereunder.

Extending between the side frames is a brace 30 which is positioned to support the forward end of the trough 23 and to pivotally support at 31 a yoke 32 upon which is mounted the dorsal fin straightener 33. The construction of this straightener and guide is illustrated in Figure 6, and is described in full detail in my above mentioned copending application. As will be seen from the figures, however, it is substantially V-shaped, having an open bottom and provided with a series of pairs of spring fingers 39 of V formation. The lower side of the straightener trough 33 is provided with a yoke 34. Extending to one side of the machine as shown in Figure 3 is a rotatable shaft 35 on the outer end of which is mounted a lever 36 which may be swung through a limited arc and positioned as desired by means of a handle 37 which has a detent 37' engageable with a series of notches in the side of the machine. The other end of shaft 35 is provided with an eccentric pin 38 which engages a notch in the yoke 34 so that by angularly positioning shaft 35 the trough 33 may be swung up and down and positioned at the desired location.

Mounted on each side frame 1 is a standard 40 which may be vertically adjusted and then locked in position by means of the machine screws 42. At 41 is an adjusting screw by means of each of which the vertical adjustment of the standards may be effected.

These standards 40, as will appear from Figure 3, are provided with inwardly extending hollow casings 43 in which are slidably mounted the tubular housings 44 which have splined connection with the casings 43. By means of this construction the housings may slide within the casings without turning. The outer ends of the housings are provided with collars 45 which have inwardly extending arms 46 each of which is provided with a pair of spaced rollers 47. These rollers engage a cam 48 which is mounted upon a carrier 49, which carrier in turn is mounted on a pair of bars or rods 50. These rods 50 as will be seen in Figure 1 are slidably supported in the standards 40. These bars are longitudinally reciprocated in the proper timed relation by means of a cam, not shown, which may be driven from any suitably operated part of the machine. At the top of collar 45 is a lug 45ª positioned to engage a pair of adjustable lock nuts 20 mounted on a pin 20ª secured in the fixture 20ᵇ. By this construction the inward movement of housing 44 is limited to the exact distance to position the slitting knives 61 and stopper blocks 62, to be described later, to the proper relative operating position.

Journaled in the housing 44 is a shaft 51 which terminates at its outer end in a pulley 52 and connected by a belt 53 to a pulley 54 which is secured to the same shaft as pulley 55. Pulley 55 is driven from any suitable power source by means of the belt 56. The pulleys 54 and 55 are mounted on a bracket 40ª, see Figure 1, on the side of each standard 40.

As will be noted from Figure 3, this mechanism is duplicated on each side of the machine. Shaft 51 is connected to shaft 58 by means of a universal coupling member 57. The shaft 58 is journaled in a head 59 which is angularly positionable on the extending end of the housing 44 and may be located at any desired angle by means of the lock screws 60. The outer ends of the shafts 58 are provided with circular knives 61, each of which knives has secured on its inner face adjacent the periphery, in equally spaced positions, a series of smooth or roughened gripper blocks 62. It is pointed out that any suitable number of these blocks may be employed, such as 4, 6, 8, or the like. By this arrangement it will be seen from Figure 3 that the circular knives 61 are positioned so as to converge at their upper edges and to project into the path of movement of a fish as it moves along the trough 33. At the side of the knives 61 opposite to that at which the trough 33 is positioned is another trough 100, see Figure 2, which simply guides the fish from the knives 61 to the next pair of knives which form the parallel incisions in the back of the fish from the tail to the head end adjacent the back spikes, in accordance with the disclosure in my copending above mentioned application.

The operation of this mechanism will now be described. With the power turned on shaft 3 will be revolving, causing the pairs of chains to travel to the left, Figure 1, on the upper level and to the right on the lower level. At the same time the circular knives 61 are revolving at the proper speed. A headed fish, back down and tail first is moved along the trough or chute 23 by hand or by means of an automatic feeding device so that it will pass between the gates 24. These gates serve to vertically position the fish. The fish is moved until its tail projects beyond the ends of the gates, and is in a position to be engaged by the spiked gripper plates 15 as they swing up on to the upper level. As a pair of these plates swing upwardly they are in spaced apart relation by reason of the engagement of the rollers 14 with the camming surfaces 18. However, as these rollers move into the region of the curved camming surfaces 21ª and 17ª the gripper plates begin to move towards each other. This results from the fact that the rollers 13 engage the camming surfaces 21ª, causing the bars 12 to move towards each other. One feature of this construction is found in the fact that the rollers which carry the burden of forcing the gripper plates into firm engagement with the tail of the fish are in alignment with the line of force. Thus it is the camming surfaces 21ª acting on the rollers 13 which causes the gripper plates to move towards each other and firmly engage the tail of the fish. The camming surfaces 17ª and the similarly shaped camming surfaces 21ª of the plates 21 merely form a guide path through which the rollers 14 move. These rollers, at this stage of the operation, however, have no function. It will be apparent that if the operating and gripping forces were applied to the rollers 14 off the center of the bars 12 there would be a tendency for these bars to bind in their seats in the blocks 8. As the rollers 13 reach the straight sides of the cam angle irons 22 the gripper plates have moved to an adjacent position and their spikes 16 have firmly gripped the fish at its tail.

As the gripper plates continue to move to the left they draw the fish from the trough 23 on to the guide and fin straightening trough 33. The dorsal fins of a fish naturally close down against the back of a fish in a direction towards the tail. In other words, the bony structure of the dorsal fins points rearward of the fish. By reason of the construction and position of the spring fingers 39 the dorsal fins are engaged and spread out to their normal straight position vertical to the back of the fish, as is clearly shown in Figure 4. Thus the dorsal fins are stretched into the flat plane vertical to the back of the fish and are guided between the circular knives as the fish moves from the guide 33 into the range of action of the circular knives. As the fish moves over the guide 33 the pressure shoe 29 by reason of the weight of its structure bears uniformly down on the fish on its belly side, holding it firmly in the guide 33. As the fish moves into the range of action of the circular knives 61 their cutting edges at the very top engage the fish at the base of the tail at its back and begin to make converging cuts along the back in the manner clearly indicated in Figure 5. This partially cuts out a triangular strip of fish S directly along the longitudinal axis of the fish and on opposite sides of the dorsal fins, which are in an extended position, as shown in Figure 4.

By reason of the positioning of the circular knives, the gripping blocks 62 as they travel towards the high point of their circular path move towards each other. Thus they grip between them the thin strip of flesh S which is being cut from the back of the fish and pull or strip it from the fish, breaking it loose along the narrow point of attachment, as will be seen from a consideration of Figure 5. The circular knives 61 continue their cut throughout the length of the fish, with the gripping blocks 62 breaking the strip of flesh S loose; so as the fish moves on to the trough 100 and out of the range of the knives 61 a long narrow strip of flesh of substantially triangular cross section is cut from the back of the fish to which is attached the dorsal fin structure including the knuckles at the base of the fin spines. Thus at the end of this operation there is formed throughout the length of the fish, along its back, a small triangular-shaped groove from which the flesh and attached dorsal fins and knuckles have been removed. The fish then continues to be pulled by the gripper plates, tail first, in the direction of its length to the next pair of knives, which form no part of the present invention, but which as referred to above, make a pair of parallel incisions from the tail to the head end of the fish up to the backbone and closely contiguous to the back spines. As previously described, the dorsal fin knuckles having been removed, these circular knives, which are arranged in parallel relation may be placed as close together as the back spines will permit, thus reducing the amount of flesh remaining on the skeleton after it is completely filleted.

The circular knives are mounted in the reciprocal housings so that they are vertically moved apart by reciprocation of the rods 58 to permit the passage of the tail end of the fish between the knives, after which they are moved together, so that at their topmost edges they are closely spaced and engage the fish at the back so as to make shallow parallel incisions in the fish from end to end, closely adjacent to the dorsal fin knuckles.

From the above description it will be apparent that this invention resides in certain principles of construction and operation which are subject to wide variations by those skilled in the art without departure from the true scope of the invention as involved in the novel combination of parts and the novel method of operation herein disclosed. I do not therefore desire to be strictly limited to the disclosure as given for purposes of illustration, but rather to the scope of the appended claims.

What I seek to secure by United States Letters Patent is:

1. A method of removing the dorsal fins and knuckles of the fish which comprises advancing the fish in the direction of its length, making a pair of incisions in converging relation along the back of the fish on opposite sides of the vertical central axis of the fish, and stripping the band of flesh thus formed from the body of the fish with the dorsal fins attached thereto.

2. A method of removing the dorsal fins and knuckles from a fish which comprises advancing the fish in the direction of its length, making a pair of non-intersecting incisions along the back of the fish on opposite sides of and closely contiguous to the dorsal fins, and tearing the band of flesh thus formed from the body of the fish.

3. A method of removing the dorsal fins and knuckles from a fish which comprises advancing a fish in the direction of its length, making a pair of converging incisions in the fish along its back on opposite sides of the dorsal fins, and closely contiguous thereto, and stripping the band of flesh formed by the incisions.

4. A method of removing the dorsal fins and knuckles from a fish which comprises advancing the fish in the direction of its length, straightening and guiding the dorsal fins in a common plane, making a pair of shallow converging incisions along the fish closely contiguous to the dorsal fins, and stripping the band of flesh thus formed from the fish.

5. A method of treating a fish which comprises advancing it back down and tail first in the direction of its length, straightening the dorsal fins into a plane, making a pair of incisions along the back of the fish closely contiguous to its dorsal fin knuckles, and tearing the band of flesh thus formed from the body of the fish.

6. In an apparatus of the type described the combination comprising a supporting frame, a carrier for advancing a fish in the direction of its length, along a defined path, and means for making a pair of converging incisions along the back of the fish adjacent to its dorsal fins.

7. In an apparatus of the type described the combination comprising a supporting frame, a carrier for advancing a fish in the direction of its length along a defined path, means for making a pair of incisions along the back of the fish adjacent to its dorsal fins and converging toward its backbone, and means for guiding the dorsal fins in a plane between the line of action of the means for making said incisions.

8. In a machine of the type described the combination comprising a conveyor for moving a fish in the direction of its length, means supported adjacent the conveyor for guiding the dorsal fins of a fish in a common plane, and means acting on opposite sides of said plane to make a pair of converging shallow incisions along the back of the fish.

9. In a machine of the type described the combination comprising a conveyor for moving a fish in the direction of its length, means supported adjacent the conveyor for guiding the dorsal fins of a fish in a common plane, means acting on opposite sides of said plane to make a pair of shallow incisions along the back of the fish, and means for stripping the band of flesh formed by said incisions from the body of the fish.

10. In a machine of the type described the combination comprising a conveyor for moving a fish in the direction of its length, means supported adjacent the conveyor for guiding the dorsal fins of a fish in a common plane, means acting on opposite sides of said plane to make a pair of shallow incisions along the back of the fish, means for stripping the band of flesh formed by and between said incisions from the body of the fish, said incising and stripping means comprising a pair of circular knives and a plurality of cooperating pairs of gripper blocks.

11. In a machine of the type described the combination comprising a supporting frame, an endless conveyor mounted on said frame, fish gripping means mounted on said conveyor, and means mounted adjacent said conveyor for making a pair of converging shallow incisions along the back of the fish.

12. In a machine of the type described the combination comprising a supporting frame, an endless conveyor mounted on said frame, fish gripping means mounted on said conveyor, means mounted adjacent said conveyor for making a pair of shallow incisions along the back of the fish, and means for gripping the band of flesh thus formed and stripping it from the body of the fish.

13. In a machine of the type described the combination comprising a supporting frame, an endless conveyor mounted in said frame, means mounted on said conveyor for gripping a fish and advancing it in the direction of its length, and a pair of converging circular knives positioned to make shallow incisions along the back of the fish adjacent its dorsal fins as the conveyor advances the fish in the direction of its length.

14. In a machine of the type described the combination comprising a supporting frame, an endless conveyor mounted in said frame, means mounted on said conveyor for gripping a fish and advancing it in the direction of its length, a pair of converging circular knives positioned to make incisions along the back of the fish adjacent its dorsal fins as the conveyor advances the fish in the direction of its length, and means in advance of the circular knives for straightening the fins of the fish into a plane between the circular knives.

15. In a machine of the type described the combination comprising a supporting frame, an endless conveyor mounted in said frame, means mounted on said conveyor for gripping a fish and advancing it in the direction of its length, a pair of circular knives positioned to make incisions along the back of the fish adjacent its dorsal fins as the conveyor advances the fish in the direction of its length, means in advance of the circular knives for straightening the fins of the fish into a plane between the circular knives, and means for tearing the band of flesh thus formed from the body of the fish.

16. In a fish treating machine of the type described, the combination comprising a framework, an endless conveyor supported on said framework, gripping means mounted on said conveyor, means for operating the gripping means, a conveyor, circular knives rotatably supported on said framework adjacent said conveyor, and means for angularly positioning the circular knives with respect to each other.

17. In a fish treating machine of the type described, the combination comprising a framework, an endless conveyor supported on said framework, gripping means mounted on said conveyor, means for operating the gripping means, a conveyor, circular knives rotatably supported on said framework adjacent said conveyor, means for angularly positioning the circular knives with respect to each other, and fin straightening means in advance of the circular knives for straightening and guiding the fins of a fish between said knives.

18. In a fish treating machine of the type described, the combination comprising a framework, an endless conveyor supported on said framework, gripping means mounted on said conveyor, means for operating the gripping means, a conveyor, circular knives rotatably supported on said framework adjacent said conveyor, means for angularly positioning the circular knives with respect to each other, fin straightening means in advance of the circular knives for straightening and guiding the fins of a fish between said knives, and stripping means for removing the band of flesh formed by the circular knives from the body of a fish.

19. In a fish treating machine the combination comprising a supporting frame, conveyor means for advancing a fish in the direction of its length, a pair of rotatably supported circular knives for making shallow incisions along the back of a fish, and means for causing the knives to move towards and away from each other.

20. In a fish treating machine the combination comprising a supporting frame, conveyor means for advancing a fish in the direction of its length, a pair of rotatably supported circular knives for making shallow incisions along the back of a fish, means for causing the knives to move towards and away from each other, and means for guiding the dorsal fins of a fish in a plane between said knives.

21. In a machine for treating fish the combination comprising a conveyor for moving a fish in the direction of its length, a pair of rotatable circular knives positioned to engage a fish as it is moved by the conveyor, and means for causing the knives to reciprocate towards and away from each other to cause them to engage the fish at the back and make a pair of parallel incisions adjacent the dorsal fins on opposite sides from one end of the fish to the other.

22. In a machine for treating fish the combination comprising a conveyor for moving a fish in the direction of its length, a pair of rotatable circular knives positioned to engage a fish as it is moved by the conveyor, means for causing the knives to reciprocate towards and away from each other to cause them to engage the fish at the back and make a pair of parallel incisions adjacent the dorsal fins on opposite sides from one end of the fish to the other, and means for guiding the dorsal fins in a plane between said knives.

23. A method of treating fish which comprises advancing a fish along a defined path of travel, making a pair of incisions along the back of the fish so that the planes of the incisions converge, and removing the strip of flesh defined by the incisions with the dorsal fins and knuckles attached.

24. A method of treating a fish which comprises advancing the fish along a defined path of travel, making a pair of non-intersecting incisions along the back of the fish, and removing the strip of flesh thus formed with the dorsal fins and knuckles attached.

25. A method of treating a fish which comprises advancing the fish along a defined path of travel, cutting the fish along its back on opposite sides of the dorsal fins, and tearing the band of flesh thus formed from the back of the fish with the dorsal fins and knuckles attached.

26. A method of treating a fish which comprises advancing the fish along a defined path of travel, cutting the fish along its back in planes extending towards the backbone of the fish, and removing the band of flesh thus formed with the dorsal fins and knuckles attached.

27. In an apparatus of the type described the combination comprising a supporting frame, a carrier for advancing a fish in the direction of its length, along a defined path, and means for making a pair of incisions along the back of the fish adjacent to its dorsal fin, the planes of the incisions converging towards the backbone of the fish.

28. In a machine for treating fish the combination comprising a conveyor for advancing a fish in the direction of its length, a pair of rotatably supported knives mounted adjacent the conveyor, means for positioning said knives so that the planes thereof converge and make incisions along the back of a fish at opposite sides of the dorsal fin, and means mounted on said knives for stripping the band of flesh between the incisions.

29. In an apparatus of the type described the combination comprising a carrier for advancing the fish in the direction of its length, means for making a pair of incisions along the back of a fish on opposite sides of the dorsal fin, the depth of the incisions extending but a short distance below the dorsal fin knuckles to form a band of flesh, and means for removing the band thus formed with dorsal fins and knuckles attached.

WILLIAM H. HUNT.